April 13, 1965 B. McFARLIN 3,178,139
FLAGSTAFF AND HOLDER FOR VEHICLES
Filed April 30, 1963
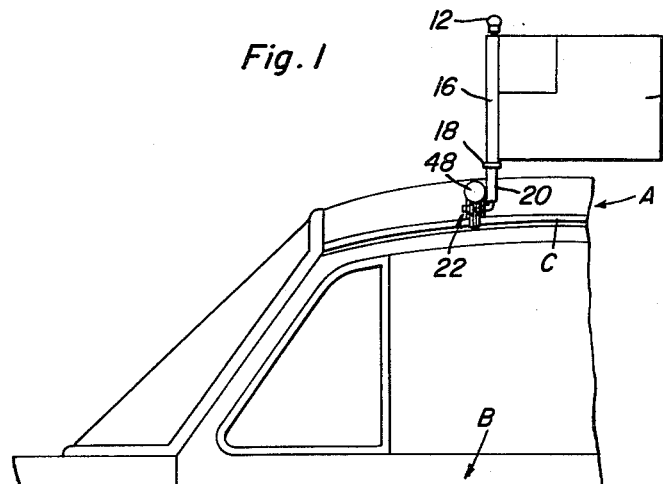
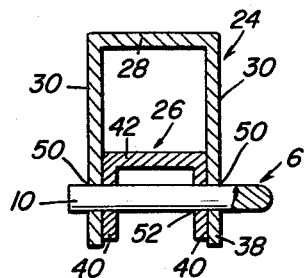
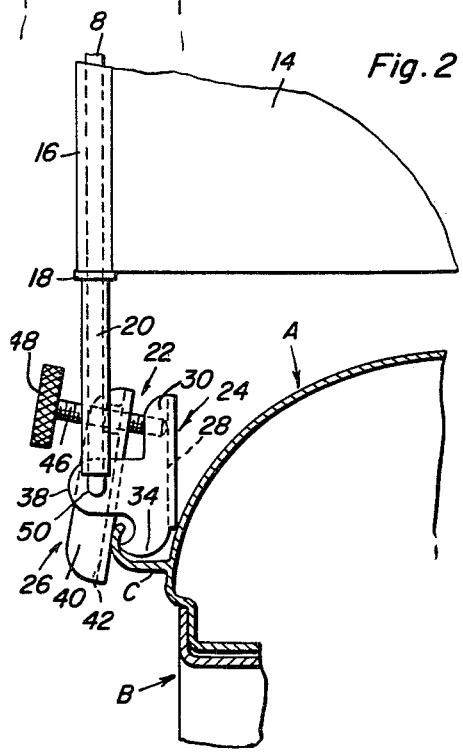
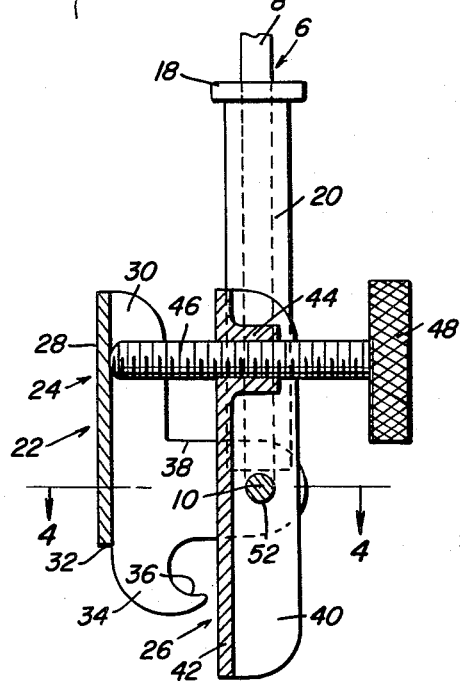
Ben McFarlin
INVENTOR.

3,178,139
FLAGSTAFF AND HOLDER FOR VEHICLES
Ben McFarlin, 3810 Westheimer, Suite 324,
Coushatta, La.
Filed Apr. 30, 1963, Ser. No. 276,787
7 Claims. (Cl. 248—43)

This invention relates to a novel staff and holder therefor which is structurally designed and uniquely adapted to be clampingly mounted on a rain gutter of the type provided on most makes of automobiles and wherein said staff serves to permit the attachment thereto of flags, pennants, banners, streamers, signs and the like.

One conversant with the art to which the invention relates and, having surveyed the field of endeavor under advisement, would confirm the fact that holders for flags, pennants and the like, particularly for funeral flags, decorative insignia and the like are old and well known. Moreover, it is common in the art to utilize a staff or standard on the upper end of which the flag is mounted and wherein the lower end thereof is provided with bracketing or clamping means, of one type or another, for attaching the staff to the car's rain gutter. It follows that an object of the instant presentation is to structurally, functionally and in other similar ways improve upon prior art holders for rain-gutter-attached flags or flagstaffs as the case may be.

One improvement, compared to known prior art adaptations, has to do with the provision of a simple, economical and practical flagstaff. More particularly the staff comprises a length of rigid rod stock wherein one end portion is bent laterally to provide a substantially L-shaped staff. The upper end is provided with a flag-retaining knob and the median portion with a flag-positioning sleeve. The lateral lower end portion provides a hinging and mounting journal in a manner to be hereinafter particularly described.

Another improvement resides in the clamping bracket or mounting by way of which the journal-equipped lower end of the staff is positioned, adjustably mounted and in fact clampingly secured to the rain-gutter.

The means recited for mounting or clamping on the rain-gutter is characterized by a two-part clamping bracket, the parts having coacting median portions connected and held together by the journal means on the lower end of the staff.

More particularly novelty is predicated on the two-part clamping bracket wherein both parts are channel-shaped in cross-section, there being an inner part and an outer part, the flanges on the outer part having aligned holes and providing bearings. Corresponding flanges on the inner part have spaced parallel extensions which define ears. The ears overlap the first-named flanges and are also provided with aligned openings or holes which constitute additional bearings, the respective paired bearings serving to accommodate and mount the journal on the lower end of the aforementioned staff.

Then, too, the featured readily applicable and removable clamping bracket is such that the flanges on the inner part are provided with properly shaped and outwardly pointed hooks which actually hook into the rain-gutter conformingly and in conjunction with a headed or an equivalent retaining screw, retain the bracket on the rain-gutter with the reliability desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view showing a fragmentary portion of an automobile or equivalent car or vehicle with a rain-gutter, illustrating a flag, flagstaff and means whereby these component parts are assembled and mounted on the rain-gutter;

FIGURE 2 is a view on a larger scale which illustrates the construction of the essential flagstaff and clamping and mounting bracket means therefor;

FIGURE 3 is an exaggerated view with parts in section and elevation detailing the construction of the clamping bracket; and FIGURE 4 is a horizontal section on the section line 4—4 of FIGURE 3.

In the drawing, the roof A of the automobile or equivalent car or vehicle B is shown provided with a conventional rain-gutter C on which the clamping bracket for the flagstaff is detachably mounted in the manner illustrated.

The flagstaff (standard or equivalent upright) is denoted by the numeral 6. It comprises a bendable but rigid rod which in side elevation is substantially L-shaped and consequently embodies a relatively long normally perpendicular limb 8 and a relatively short right-angularly disposed horizontal limb 10. The latter limb constitutes the aforementioned mounting and adjusting journal. On its upper end the staff proper 8 is provided with an applicable and removable suitably constructed and mounted knob or the like 12. The flag, pennant or other insignia or emblem which is to be mounted above the roof of the car is denoted by the numeral 14 and has a hem or the like 16 mounted on the upper portion of the shaft with the lower end resting on a washer or an equivalent shoulder 18 on the shaft, said shoulder mounted at the upper end of a sleeve or the like 20. The lower end of the sleeve rests on the bend at the juncture of the two portions 8 and 10 of the flagstaff.

The mounting, adjusting and clamping bracket means as an assemblage is denoted by the numeral 22. This bracket means is characterized primarily by a pair of inner and outer companion or component parts the inner parts are denoted at 24 and the outer parts at 26. While both parts are basically the same in construction in that they are channel-shaped in cross-section it is desirable to describe the parts separately. To this end the channel-shaped part 22 as shown in FIG. 3 is of one piece construction and has a web or plate portion 28 which is provided along opposite lengthwise edges with spaced parallel outstanding flanges 30. The lower end portions of the flanges extend below the lower end 32 of the web where they are formed into beak-like extensions 34 whose bill portions are shaped and directed in the manner indicated at 36 and these beaks constitute conformable anchoring and supporting hooks. The hooks are seated in the gutter of the rain-gutter in the manner illustrated in FIG. 2. The median portions of the flanges 30 are provided with lateral extensions 38 which constitute ears. These ears straddle median portions of the spaced parallel flanges 40 carried by the web portion 42 of the outer bracket 26. The upper part of the web portion is provided with a hole and an aligned internally screw-threaded collar which provides a suitable nut 44 for the screw-threaded shank 46 of the screw-threaded headed fastener. This fastener may be described as a retainer screw or a setscrew. The head 48 is preferably knurled and provides an appropriate fingergrip. However in practice this head may be a machine-type and fashioned to accommodate a screwdriver as is perhaps clear. The ears 38 are provided with aligned registering holes 50 which constitute simple bearings and which are registrable with similar bearing holes 52 provided in the flanges 40. Obviously when the respective bearing holes are lined up they permit passage of the journal 10 therethrough with the journal serving to interconnect the two bracket parts 24 and 26 and at the same time function to join the bracket parts and journal-equipped staff in assembled relationship.

It will be evident that the nut 44 serves to position or locate the shank 46 of the retaining screw in such a way that the free end of the screw engages the web 28 in a proper relationship in respect to the pivotal or jointing connection between the two bracket parts 24 and 26 and functions to provide the desired relationship and cooperation between the bracket parts and the flag-supporting standard or flagstaff 6.

It will be evident that by placing the bracket bar 24 in the inwardly disposed position illustrated in FIG. 2 the hooks 34 and 36 may be caused to assume the position there illustrated. At the same time the web portion 28 of the bracket part 24 rests against the exterior of the gutter wall and in fact fulcrums thereon in a manner so that when the retainer screw is tightened the parts clamp themselves in position on the gutter and at the same time frictionally bind the journal 10 in the bearing holes or openings 50 and 52 to provide the desired mounting, clamping and adjusting result.

It is believed that by carefully studying and evaluating the illustrative views of the drawing and considering the same in relation to the specification and the invention as claimed, a clear and comprehensive understanding of the structural aspects of the invention will be obtained. Also, it is thought that the structural and other features and advantages of the invention, as well as the manner of using the same will be clear. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for flags and the like comprising a clamping bracket embodying two component parts designed and adapted to be detachably clamped upon a rain gutter on an automobile, both of said parts being channel-shaped in cross-section and each part embodying a web provided along lengthwise edges with spaced parallel flanges, there being an inner part and an outer part, the flanges on the outer part having aligned holes providing bearings, the corresponding flanges on the inner part having spaced parallel extensions defining ears, the latter overlapping the first-named flanges and having holes aligned and registering with the first-named holes and providing additional bearings, an L-shaped rod embodying a long limb defining a flagstaff and a lateral short limb providing a journal, said journal passing through and being journaled in the respectively cooperating bearings, and means carried by one of said parts and functioning to maintain said parts in a clamped manner on said gutter.

2. The structure according to claim 1, and wherein said last-named means comprises a screw-threaded headed shank threadedly mounted in a nut provided therefor on the web of the outer part and having an end engageable with the web of said inner part.

3. The structure according to claim 1, and wherein like ends of the flanges on the inner part are provided with laterally directed claw-like hooks which are designed and adapted to engage the interior side of an outer wall of said rain gutter.

4. The structure according to claim 2, and wherein like ends of the flanges on the inner part are provided with laterally directed claw-like hooks which are designed and adapted to engage the interior side of an outer wall of said rain gutter.

5. The structure according to claim 1, and in combination, a sleeve mounted on said staff, a flag mounted on the staff above and supported in part by the upper end portion of said sleeve, and a knob atop the upper end of the staff retaining the flag against displacement.

6. A holder of the class described comprising a staff, a holder for said staff embodying means for detachably mounting the same on a relatively stationary support, said staff having means at its lower end detachably and adjustably joined to said holder, a sleeve mounted on said staff having an upper end terminating below the upper end of the staff, and a knob mounted removably on the upper end of said staff and spaced above the sleeve's upper end and providing an intervening space for a flag or the like, said staff comprising an L-shaped rod embodying a long limb and a short limb, said long limb providing the staff proper and said short limb providing a journal and constituting the means for detachably mounting said staff on said support.

7. A holder of the class described comprising a staff, a holder for said staff embodying means for detachably mounting the same on a relatively stationary support, said staff having means at its lower end detachably and adjustably joined to said holder, a sleeve mounted on said staff having an upper end terminating below the upper end of the staff, and a knob mounted removably on the upper end of said staff and spaced above the sleeve's upper end and providing an intervening space for a flag or the like, said holder comprising a two-part clamping bracket, said parts having coacting median portions connected with and held together by the means at the lower end of said staff.

References Cited in the file of this patent

UNITED STATES PATENTS 1,597,266     Dearman     Aug. 24, 1926

CLAUDE A. LE ROY, *Primary Examiner.*

UNITED STATES PATENT OFFICE
CERTIFICATE OF CORRECTION

Patent No. 3,178,139                      April 13, 1965

Ben McFarlin

It is hereby certified that error appears in the above numbered patent requiring correction and that the said Letters Patent should read as corrected below.

In the heading to the printed specification, lines 3 and 4, for "Ben McFarlin, 3810 Westheimer, Suite 324 Coushatta, La." read -- Ben McFarlin, Coushatta, La. (3810 Westheimer, Suite 324, Houston, Tex.) --.

Signed and sealed this 12th day of October 1965.

(SEAL)
Attest:

ERNEST W. SWIDER
Attesting Officer

EDWARD J. BRENNER
Commissioner of Patents